(12) United States Patent  (10) Patent No.: US 7,876,813 B2
Uhlemann et al.  (45) Date of Patent: Jan. 25, 2011

(54) COMMUNICATION SYSTEM, DEVICE AND DATA TRANSMISSION METHOD

(75) Inventors: Stefan Uhlemann, Munich (DE); Gert Schedelbeck, Munich (DE)

(73) Assignee: Lantiq Deutschland GmbH, Neubiberg (DE)

(*) Notice: Subject to any disclaimer, the term of this patent is extended or adjusted under 35 U.S.C. 154(b) by 1049 days.

(21) Appl. No.: 11/653,111

(22) Filed: Jan. 12, 2007

(65) Prior Publication Data

US 2008/0170605 A1  Jul. 17, 2008

(51) Int. Cl.
*H04B 1/38* (2006.01)
(52) U.S. Cl. ...................................... 375/222
(58) Field of Classification Search ................ 375/216, 375/222, 257; 455/557
See application file for complete search history.

(56) References Cited

U.S. PATENT DOCUMENTS

| 6,148,006 | A | 11/2000 | Dyke et al. | |
| 6,366,554 | B1* | 4/2002 | Isaksson et al. | 370/206 |
| 6,847,693 | B1* | 1/2005 | Strait | 375/355 |
| 2001/0022810 | A1* | 9/2001 | Joo | 375/222 |
| 2002/0118707 | A1* | 8/2002 | Autere et al. | 370/532 |
| 2002/0191250 | A1 | 12/2002 | Graves et al. | |
| 2007/0036174 | A1* | 2/2007 | Aris et al. | 370/466 |
| 2007/0121792 | A1* | 5/2007 | Chong | 379/1.01 |
| 2007/0153835 | A1* | 7/2007 | Khasnis | 370/493 |
| 2007/0263651 | A1* | 11/2007 | Novotny et al. | 370/422 |

FOREIGN PATENT DOCUMENTS

| DE | 102004002694 A1 | 8/2005 |
| WO | WO 02/078269 A1 | 10/2002 |
| WO | WO 2005039077 A1 * | 4/2005 |

OTHER PUBLICATIONS

"SmartLeap™ 9402 and 9450 VDSL2 Chipsets." *Fiber Fast Solutions for Interactive Services™*. IKANOS Communications. 2005. (2 Pages).
Medeiro, Fernando et al. "Using Cascade Modulators for xDSL MODEMs in Digital Technologies: Architecture Selection and Systematic Design." Mixed-Signal Design Cluster Workshop on Embedded Data Converters. Stockolm, Sep. 22, 2000. (17 Pages).

* cited by examiner

*Primary Examiner*—Sam K Ahn
(74) *Attorney, Agent, or Firm*—Eschweiler & Associates, LLC

(57) ABSTRACT

A communication system comprises a first modem part arranged at a first location and a second modem part arranged at a second location that is remote from the first location. The first modem part and the second modem part in combination perform functionalities of a modem.

33 Claims, 6 Drawing Sheets

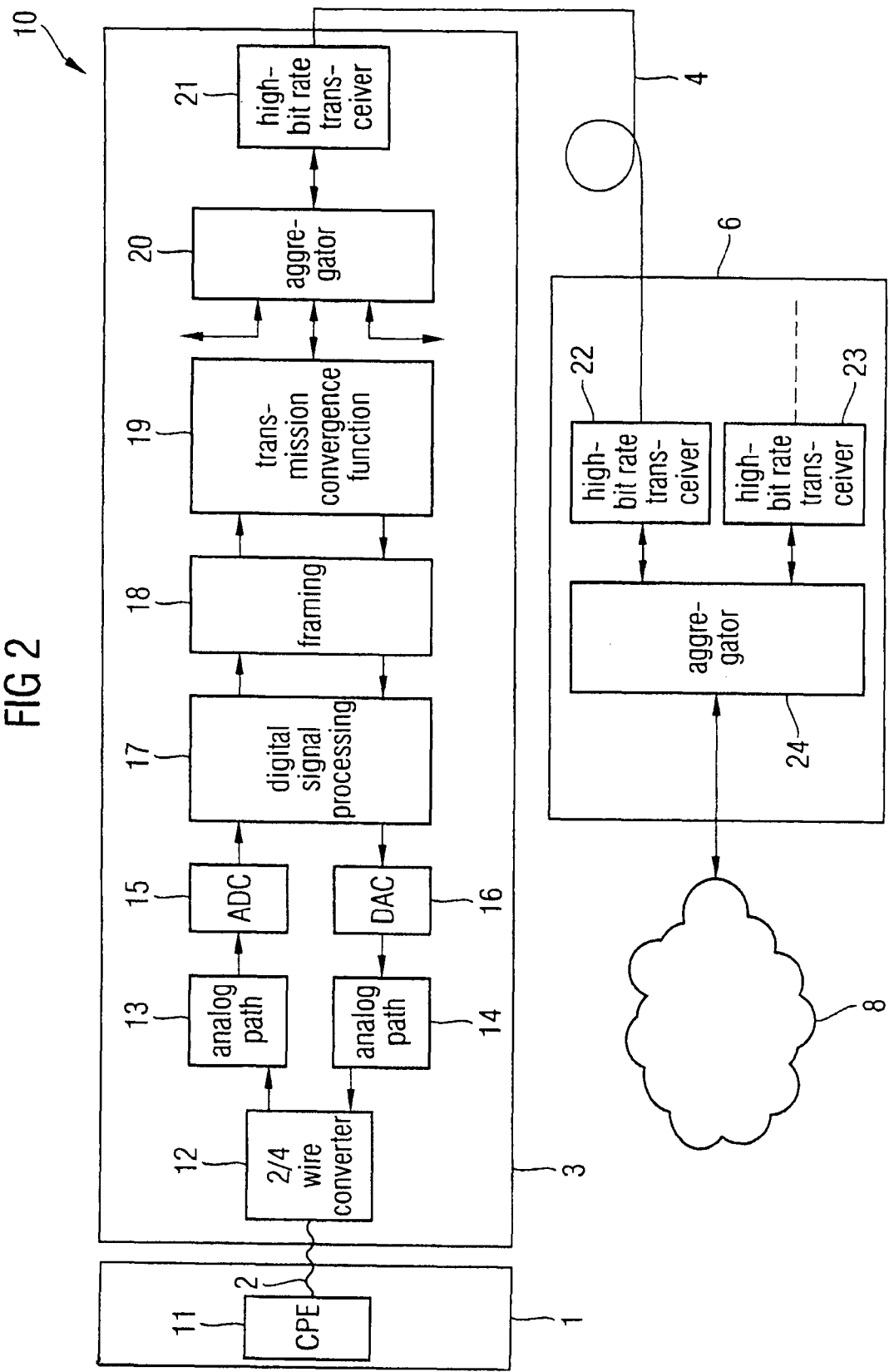

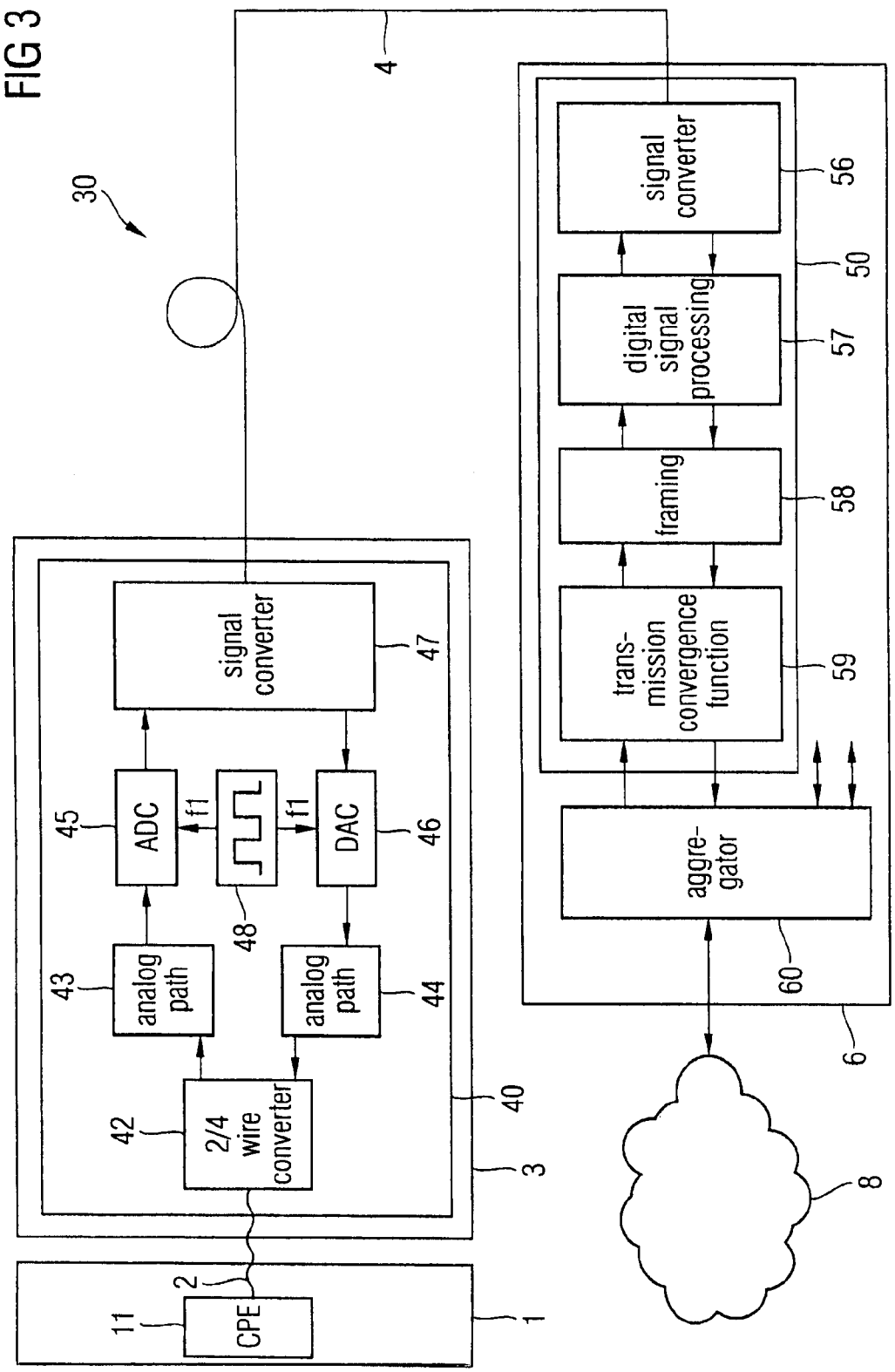

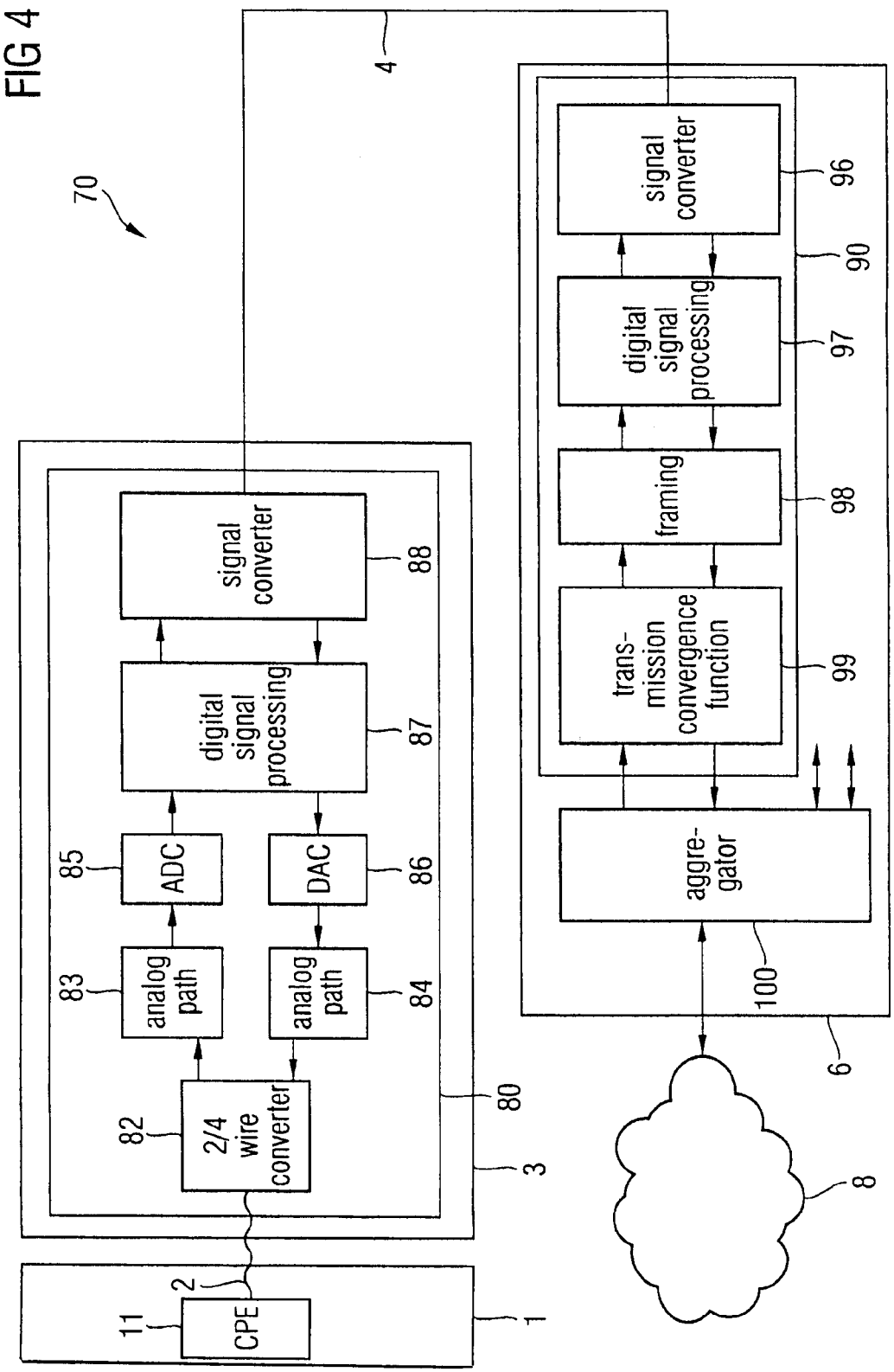

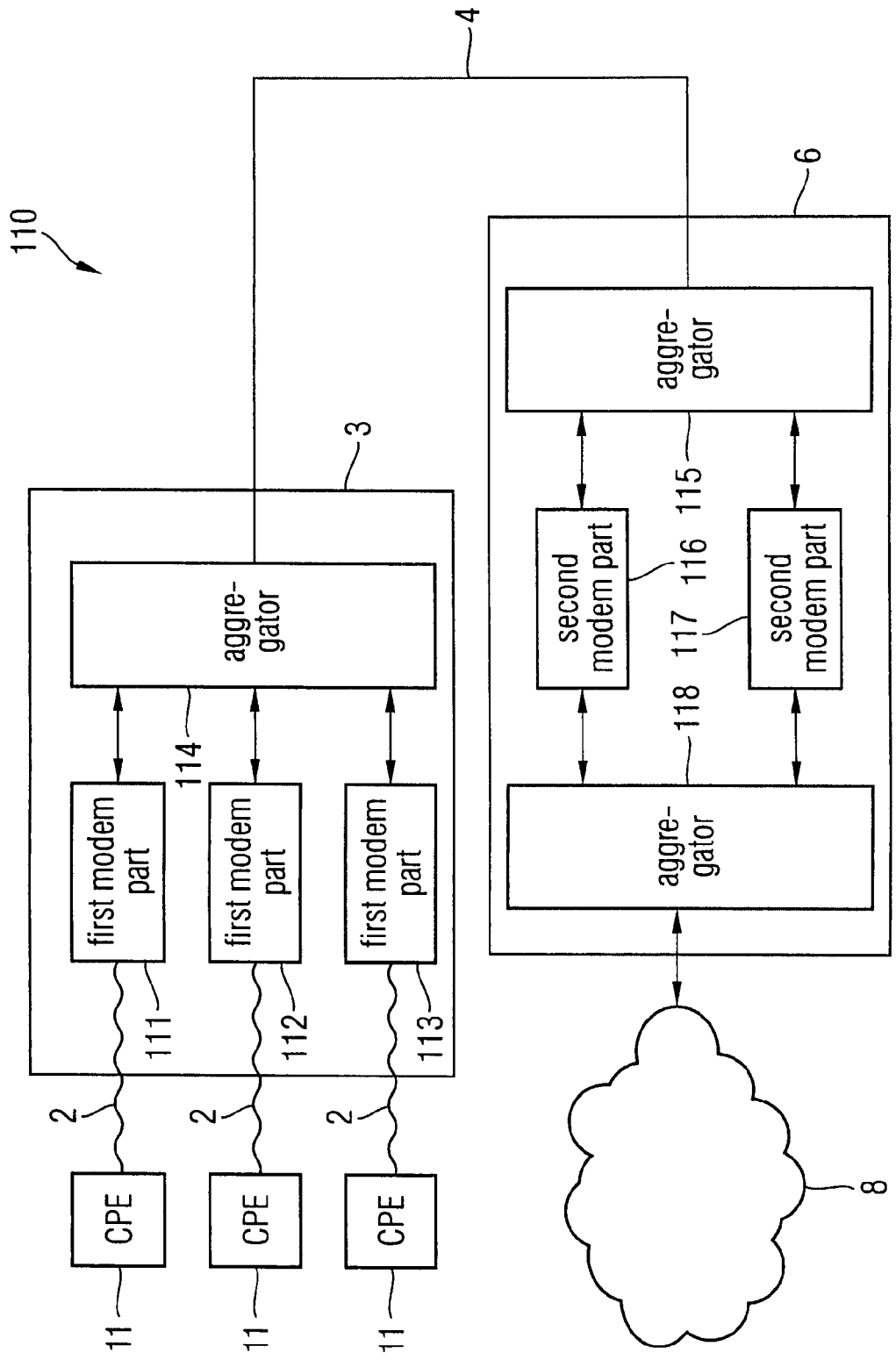

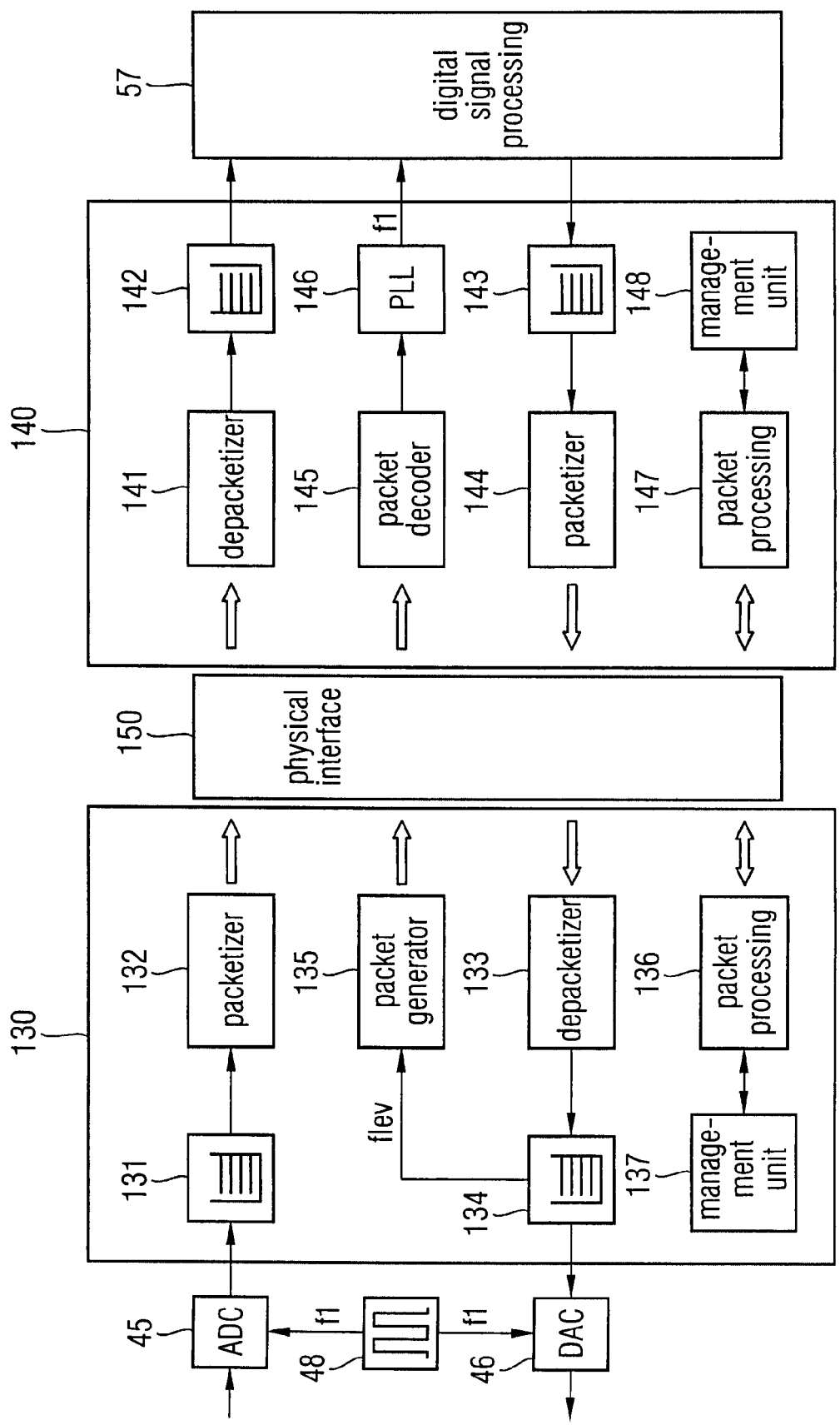

COMMUNICATION SYSTEM, DEVICE AND DATA TRANSMISSION METHOD

BACKGROUND OF THE INVENTION

The present invention generally relates to a communication system, a device and a method of transmitting data. In particular, the present invention relates to such systems, devices and methods for use in DSL technology.

The present invention generally relates to the field of communication systems and communication services. Providers of telecommunication services nowadays frequently offer data services in addition to conventional telephone services. When copper wire pairs are employed, in addition to plain old telephone services (POTS), data services may be provided using various xDSL technologies, such as SDSL, SHDSL, ADSL, or VDSL. When DSL technologies are utilized, a DSL modem or DSL transceiver has to be provided on both a customer side and a central office side, the latter modem being operated by the service provider. The service provider frequently installs a digital service access multiplexer (DSLAM) that comprises a plurality of DSL modems, each of which is connected to a copper wire pair. The DSLAM may be provided in a central office or may be arranged at a location that is closer to customer premises than the central office, such as a street cabinet. Providing the DSLAM in a street cabinet has the advantage that higher data transmission rates are achievable since achievable data transmission rate increase with decreasing length of the copper wire pair, i.e., the closer the DSLAM is located to the customer premises.

SUMMARY

A communication system includes a first modem part at a first location and a second modem part arranged at a second location. The first modem part and the second modem part in combination perform functionalities of a modem. The first location is remote from said second location.

BRIEF DESCRIPTION OF THE SEVERAL VIEWS OF THE DRAWINGS

FIG. 2 is a block diagram representation of a conventional DSL communication system.

FIG. 3 is a block diagram representation of a DSL communication system according to an embodiment of the invention.

FIG. 4 is a block diagram representation of a DSL communication system according to another embodiment of the invention.

FIG. 5 is a block diagram representation of a DSL communication system according to yet another embodiment of the invention.

FIG. 6 is a schematic block diagram representation of signal converters.

DETAILED DESCRIPTION OF THE INVENTION

Figure 1:
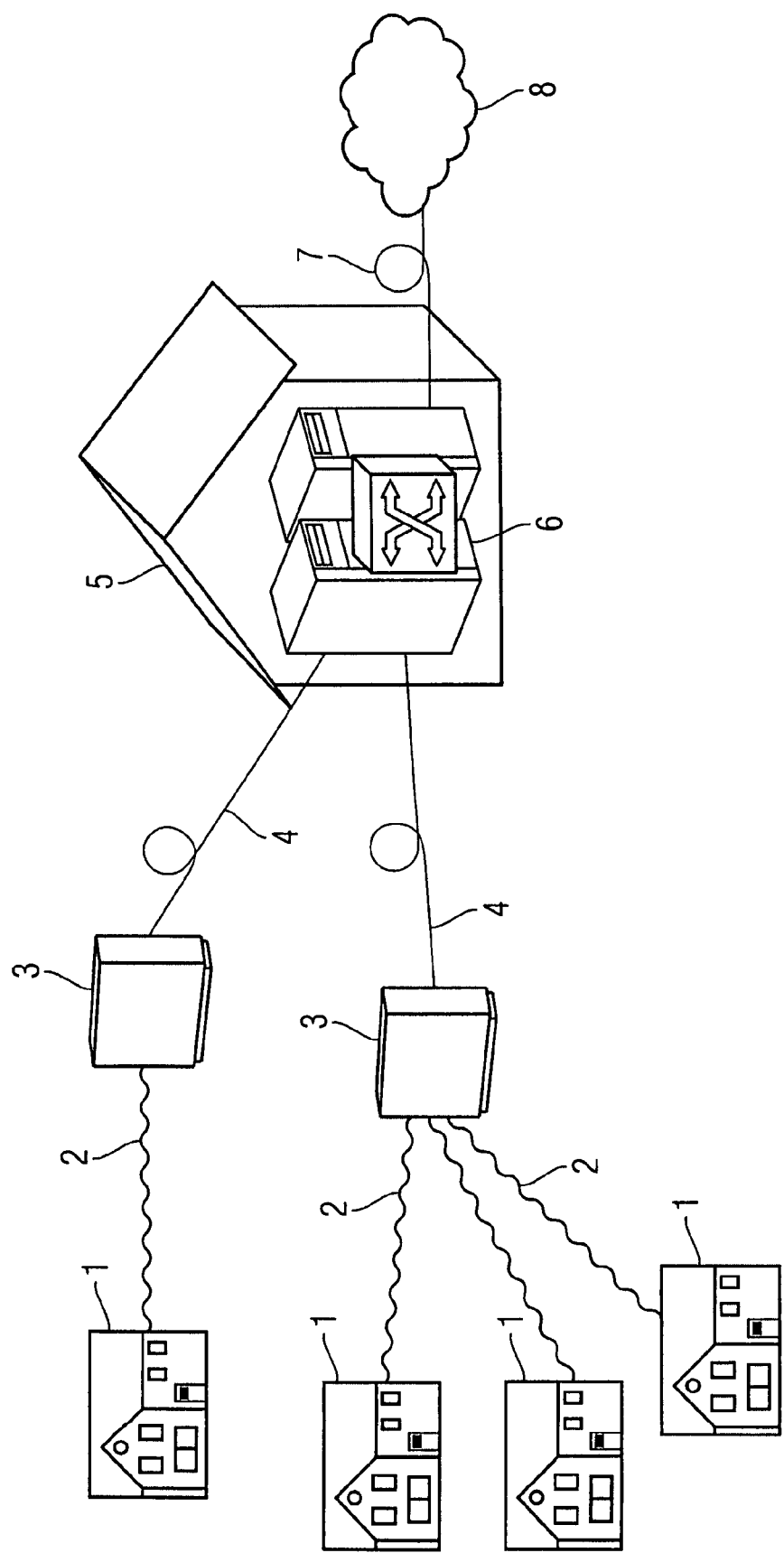
FIG. 1 is a schematic representation of a topology of a DSL access network.

In the following, exemplary embodiments of the present invention will be described in detail. It is to be understood that the following description is given only for the purpose of illustrating the principles of the invention and is not to be taken in a limiting sense. Rather, the scope of the invention is defined only by the appended claims and is not intended to be limited by the exemplary embodiments described hereinafter.

It is also to be understood that, in the following description of exemplary embodiments, any direct connection or coupling between functional blocks, devices, components, or other physical or functional units shown in the drawings or described herein could also be implemented by an indirect connection or coupling.

Further, it is to be understood that the features of the various exemplary embodiments described hereinafter may be combined with each other, unless specifically noted otherwise.

FIG. 1 is a schematic representation of a topology of an access network for data transfer between a wide area network (WAN), such as the internet, 8 and a plurality of customer premises 1. In the exemplary topology shown in FIG. 1, the DSLAMs are no longer provided in a central office or local exchange 5, but rather are installed in street cabinets 3. Thereby, the distance over which data has to be transmitted via copper wire pairs 2 is decreased, which in turn increases achievable data transmission rates between the customer premises 1 and the DSLAMs. The outdoor DSLAMs are connected to an access router 6 provided in the central office 5 via broadband data connections 4.

FIG. 2 is a block diagram representation of a conventional communication system in the form of an access network 10. Installed in customer premises 1 is customer premises equipment (CPE) 11. Installed in a street cabinet 3 is a conventional DSLAM comprising a conventional DSL modem that includes, e.g., a 2/4 wire converter 12, analog receiving and transmitting paths 13, 14, A/D- and D/A-converters 15, 16, a digital signal processing unit 17, a framing unit 18, and a transmission convergence function unit 19. The DSLAM further comprises an aggregator 20 that aggregates signals for a plurality of DSL modems and transmits the aggregated signal via high bit-rate transceiver 21 to a high-bit rate transceiver 22 installed in the central office. In the central office, the signals from multiple outdoor DSLAMs are aggregated by a further aggregator 24.

The operation of one or several of the components comprised by the DSLAM installed in the street cabinet 3 is usually dependent on the DSL standard employed. In particular, the operation of one or several of the digital signal processing unit 17, the framing unit 18, and the transmission convergence function unit 19 are dependent on the DSL standard.

FIG. 3 is a schematic block diagram representation of a communication system in the form of a DSL access network 30 for transmitting data from customer premises 1 to a wide area network 8 according to an embodiment. The access network 30 comprises a modem having a first modem part 40 and a second modem part 50 interconnected by a broadband data connection 4, such as an optical fiber. The first modem part 40 is installed at a location intermediate between the customer premises 1 and the central office, while the second modem part 50 is installed in the central office. As will be explained in more detail below, the first modem part 40 and the second modem part 50 each comprise such circuitry that the first modem part 40 and the second modem part 50 in combination perform all functionalities of a fully operational DSL modem. The first modem part 40 has an analog interface, to which customer premises equipment (CPE) 11 installed in customer premises 1 is connected via a copper wire pair 2. The second modem part 50 has a digital interface connected to an aggregator 60 also provided in the central office for transmission of data to and from the wide area network 8.

The first modem part 40 according to the embodiment of FIG. 3 comprises a 2-wire to 4-wire converter 42, an analog receiver path 43, an analog transmitting path 44, an A/D- converter 45, a D/A-converter 46, a signal converter 47 and a clock generator 48. The 2-wire to 4-wire converter 42 is coupled to the copper wire pair 2 and the analog receiving and transmitting paths 43, 44 to split upstream and downstream signals. In an embodiment, the analog receiving path 43 and the analog transmitting path 44 each comprise a low pass filter. In another embodiment, the analog receiving path 43 and the analog transmitting path 44 each comprise a low pass filter and an amplifier. In yet another embodiment, the amplifier is programmable. In an embodiment, the A/D-converter 45 and the D/A-converter 46 are each constructed as multi-bit sigma delta converters. The signal converter 47, an exemplary implementation of which will be described in more detail below, interfaces the A/D-converter 45 and D/A-converter 46, respectively, with the broadband data connection 4. In one embodiment, the signal converter 47 comprises an electro-optical interface. The clock generator 48 provides a clock pulse having a frequency f1 to the A/D-converter 45 and to the D/A-converter 46, respectively.

The operation of the first modem part 40 will be explained next. An analog signal received at the 2-wire to 4-wire converter 42 is provided to the analog receiving path 43 where the signal is low pass filtered. The A/D-converter 45 receives and samples the low pass filtered signal. In an embodiment, A/D-converter 45 oversamples the signal and subsequently reduces the digital bit stream to a predetermined Nyquist rate. In an embodiment, the Nyquist rate is equal to or greater than 24 MHz. In another embodiment, the Nyquist rate is equal to or greater than 60 MHz. The bit stream thus generated is subsequently provided to the signal converter 47 which outputs the data to the broadband data connection 4. It is to be understood that this operation and configuration is only exemplary and that many variations are conceivable. For example, the analog signal may also be band-pass filtered in the analog receiving path 43. Further, the digital bit stream does not need to be reduced to the predetermined Nyquist rate prior to subsequent processing, and the oversampled signal could be processed further.

In the downstream direction, data received from the broadband data connection 4 via signal converter 47 is provided to the D/A-converter 46, where the signal is interpolated from the predetermined Nyquist rate. After low pass filtering in the analog transmitting path 44, the signal is output to the copper wire pair 2 via the 2-wire to 4-wire converter 42.

The predetermined Nyquist rate to which the sampled signal is reduced by the A/D-converter 45 and from which the signal is interpolated by the D/A-converter 46 is twice the analog bandwidth of the copper wire pair 2. If the communication system 30 of FIG. 3 is anticipated to be employed with various DSL standards, the predetermined Nyquist rate is selected so as to be at least twice the analog bandwidth of the DSL standard having maximum analog bandwidth. In another embodiment, the sampling rate of the A/D-converter 45 and D/A-converter 46 is configurable.

The second modem part 50 comprises a signal converter 56, a digital signal processing unit 57, a framing unit 58 and a transmission convergence function unit 59. The signal converter 56 serves as an interface with the broadband data connection 4. In an embodiment, the signal converter 56 comprises an electro-optical interface. The digital signal processing unit 57, the framing unit 58 and the transmission convergence function unit 59 in combination have the function of converting a digital bit stream that represents the sampled analog signal into data that has a data format suitable for transmission to the internet or another general-purpose network, such as IP packets.

In an embodiment, the digital signal processing unit 57 has one or several of the functions of data filtering, echo cancellation, interleaving or similar. In an embodiment, the framing unit 58 has one or several of the functions of framing and/or unframing data, sorting bits according to logical aspects or error correction. In an embodiment, the transmission convergence function unit 59 provides an interface between the first and second layers according to the OSI layer model. More particularly, in an embodiment, the transmission convergence function unit 59 and the framing unit 58 map a bit stream onto a packet-, frame- or cell-based data stream and vice versa. The packets, frames or cells, such as Ethernet or IP packets, are then transmitted to or from the wide area network 8 via the aggregator 60.

Next, the operation of the access network 30 of the embodiment of FIG. 3 will be explained. For upstream data transmission, an analog signal is transmitted from the customer premises 1 to the first modem part 40 located at a location intermediate between the central office and the customer premises. The first modem part 40 performs an A/D-conversion of the analog signal and transmits the thus generated sampled signal via the broadband data connection 4 to the second modem part 50 that is located in the central office. The second modem part 50 then demodulates the signal received from the first modem part 40 and converts the signal into, e.g., an ATM-cell, IP frame or Ethernet frame format or similar. The ATM-cells, IP frames or Ethernet frames are then transmitted to the wide area network 8. For downstream data transmission, ATM-cells, IP frames or Ethernet frames or similar are transmitted from the wide area network 8 to the second modem part 50, where the ATM-cells, Ethernet frames or IP frames are converted into a bit stream that corresponds to the modulated signal which is then transmitted to the first modem part 40 via the broadband data connection 4. In the first modem part 40, the D/A-converter 46 converts the modulated signal into an analog signal. The analog signal is transmitted to the customer premises 1 via the copper wire pair 2.

As will be understood from the above description, in the access network 30 of the embodiment of FIG. 3, the first modem part 40 and the second modem part 50 interconnected by the broadband data connection 4 in combination perform the functions of a DSL modem. However, the first modem part 40 and the second modem part 50 are arranged so that they are remote from each other, i.e., that they are separated by a large distance. More particularly, only the first modem part 40 is installed in a street cabinet or another location intermediate between the central office and customer premises, while the second modem part 50 is installed at a central location, such as the central office. Further, in the embodiment of FIG. 3, the first modem part 40 comprises modem componentry that is associated with A/D- or D/A-signal conversion. According to one embodiment, the operation of the first modem part 40 is independent of the DSL standard that is employed, provided that the sampling frequency of the A/D- and D/A-conversion is selected so as to be sufficiently high for any contemplated DSL standard. In another embodiment, the sampling frequency of the first modem part 40 may be configured in dependence on the current DSL standard. The second modem part 50 performs digital signal processing of the sampled signal provided by the first modem part 40. The second modem part 50 comprises the modem componentry, the operation of which depends on the DSL standard.

Since only the first modem part 40 is installed in the street cabinet 3, size requirements for the street cabinet 3 are reduced. Further, since the DSL modem componentry that has an operation dependent on the DSL standard is comprised by the second modem part 50 installed in the central office, when a hardware upgrade becomes necessary due to, e.g., a change in DSL standard, only the second modem part 50 installed in the central office has to be exchanged. Thus, the hardware upgrade may be performed at a central indoor location and does not require a truck roll.

FIG. 4 is a block diagram representation of a communication system in the form of an access network 70 for transmitting information between customer premises 1 and a wide area network 8 according to another embodiment of the invention. The access network 70 again comprises a first modem part 80 and a second modem part 90 remote from the first modem part 80, the first and second modem parts 80, 90 being interconnected by a broadband data connection 4. The first modem part 80 is installed in a street cabinet 3 and connected to customer premises equipment 11 via a copper line pair 2. The second modem part 90 is installed in a central office and is interfaced with the wide area network 8 via an aggregator 100.

The first modem part 80 comprises a 2-wire to 4-wire converter 82, an analog receiving path 83, an analog transmitting path 84, an A/D-converter 85 and a D/A-converter 86, the configuration, operation and function of which is identical to the one of the corresponding components of the first modem part 40 according to the embodiment explained with reference to FIG. 3 above. Further, in the embodiment of FIG. 4, the first modem part 80 also comprises a digital signal processing unit 87 that performs digital signal processing functions. In an embodiment, the digital signal processing unit 87 performs echo cancellation. In another embodiment, the digital signal processing unit 87 performs data filtering. In operation, for upstream data transmission, the sampled signal is provided from the A/D-converter 85 to the digital signal processing unit 87, from where another signal is output via signal converter 88.

The second modem part 90 comprises a signal converter 96, a framing unit 98, and a transmission convergence function unit 99, the configuration, arrangement and operation of which are identical to the respective components of the various embodiments explained with reference to FIG. 3 above. Further, the second modem parts 90 also comprise a digital signal processing unit 97. Since in the embodiment of FIG. 4, some of the digital signal processing is already performed in a first modem part 80, the digital signal processing unit 97 of the second modem part 90 is modified as compared to the embodiment of FIG. 3. In particular, in an embodiment, the digital signal processing unit 97 performs the digital signal processing functions that are not performed by the digital signal processing unit 87 in the first modem part 80. For example, if the echo cancellation is performed in the first modem part 80, it does not need to be integrated in the digital signal processing unit 97 of the second modem part 90. In an embodiment, the digital signal processing unit 97 comprised by the second modem part 90 performs the signal processing that is dependent on the DSL standard, while the digital signal processing unit 87 performs signal processing functions that are independent of the DSL standard.

As may be seen from the description of the embodiment of FIG. 4, the signal transmitted between the first and second modem parts may not only be the sampled signal generated by the A/D-converter in the first modem part. Rather, any digital intermediate modem signal may be transmitted between the first and second modem parts via the broadband data connection interconnecting the modem parts. As used in connection with these embodiments, the term "digital intermediate modem signal" refers to any digital intermediate signal transmitted in the modem in an upstream or downstream direction. In other words, a digital intermediate modem signal may be any digital signal that corresponds to an intermediate processing state of a signal in a fully operational modem.

Thus, at a location between a central office and customer premises, a digital intermediate modem signal may be generated based on an analog signal received from a subscriber by processing the analog subscriber signal with at least one modem signal processing operation of a fully operational modem. The processing performed on the analog signal may, e.g., comprise only the analog to digital conversion as described with respect to FIG. 3. According to embodiments, the processing may include further digital signal processing, as described with respect to FIG. 4, which may be independent of the DSL transmission standard. The digital intermediate modem signal is then transmitted to the central office to complete the remaining processing of the signal, as required in a fully operational modem. In other words, the intermediate signal is an incompletely processed signal, the processing of which is completed at a remote location, e.g., at the central office, for transmission over a broadband data link. In an embodiment, a digital intermediate modem signal may be a digital signal that is not fully configured for transmission to the internet.

Vice versa, in the central office, a digital intermediate modem signal is generated based on a signal received from the WAN by processing the received digital WAN signal with at least one digital processing operation of a fully operational modem. Thus, in the downstream direction, the digital intermediate modem signal is also incompletely processed, as at least a further digital-to-analog conversion is required for transmitting the signal to costumer premises.

In another embodiment, the digital intermediate modem signal has a data format configured for point-to-point transmission, i.e., for transmission between the first and second modem parts.

It is to be understood that the description of the configuration of the first and second modem parts given with reference to FIGS. 3 and 4 above is only exemplary. For example, two or more of the functional units shown in FIGS. 3 and 4 and explained above may be combined into a combined unit. In an embodiment, the framing unit and transmission convergence function unit are intercombined. In another embodiment, the digital signal processing unit, the framing unit and the transmission convergence function unit are intercombined. In an embodiment, the intercombined units are configured as integrated circuits.

The description of the various embodiments given with reference to FIGS. 3 and 4 above has been made, for illustrative purposes only, for the case in which data is to be transmitted between a single customer and the central office. It is to be understood that the principles of the invention are, however, equally applicable to the case in which data is to be transmitted from a plurality of customer premises to the central office, as will be explained next.

FIG. 5 is a schematic block diagram representation of a communication system in the form of an access network 110 according to another embodiment of the invention. In the access network 110, data is transmitted from or to a plurality of customer premises (not shown), each having CPE 11, and a wide area network 8. The access network 110 comprises a first plurality of first modem parts 111-113, each of which is associated with and coupled to one of the CPEs 11 via a copper wire pair 2. Each of the first modem parts 111-113 may have a configuration according to any one embodiment explained with reference to FIGS. 3 and 4 above. The first modem parts 111-113 installed in the street cabinet 3 are each coupled to an aggregator 114, such as an Ethernet switch. The access network 110 further comprises an aggregator 115, a second plurality of second modem parts 116, 117 and an aggregator 118 provided in the central office, the second modem parts 116, 117 being coupled to the aggregators 115 and 118. In an upstream data transmission direction, analog signals are transmitted from the CPEs 11 to the first modem parts 111-113 via the copper wire pairs 2. The first modem parts 111-113 each sample the respective analog signals to generate a digital intermediate modem signal that is transmitted to the aggregator 114 which in turn outputs the signal via the broadband data connection 4 to the aggregator 115 in the central office. The aggregator 115 that may be configured, e.g., as an Ethernet switch routes the digital signal received via the broadband data connection to one of the second modem parts 116, 117 where further signal processing is performed. The aggregator 118 which may be, e.g., an Ethernet switch, an ATM switch or similar, then outputs the data to the wide area network 8. While not shown in FIG. 5, it is to be understood that in the general case in which a plurality of CPEs is connected to first modem parts that are installed in a plurality of street cabinets, the aggregators provided in the central office will also have the function of aggregating signals transmitted to and from different street cabinets.

It will also be appreciated from FIG. 5 that, in an embodiment, the number of first modem parts installed outdoor in street cabinets is different from the number of second modem parts provided in the central office. In an embodiment, a first modem part is installed for every subscriber line, irrespective of whether the customer indeed subscribes to data services. Only when the subscriber subscribes two data services, a corresponding second modem part is installed. Since the second modem part is installed in the central office, no truck roll is required to perform the necessary hardware upgrade. Rather, the second modem part may be conveniently installed inside the central office, thereby reducing the labor costs associated with a truck roll and the susceptibility of the installation to weather conditions. Further, since under typical conditions not all customers or subscribers will require access to data services at the same time, in an embodiment, the number of second modem parts in the central office is smaller than the number of first modem parts installed outdoor. Then, one of the second modem parts performs digital signal processing of data received from any one of a number of first modem parts, depending on which of the first modem parts is presently active. For example, the second modem part 116 in FIG. 5 may perform digital signal processing for data received either from first modem part 111 or first modem part 112, depending on which of the first modem parts and associated customer premises equipment is active. Further, in an embodiment, the second modem parts installed in the central office are configured such that several channels are provided in each of the second modem parts for digital signal processing.

As has been explained with reference to FIGS. 3-5 above, the first modem part and the second modem part according to the various embodiments in combination perform functionalities of a DSL modem. Data transfer between the first and second modem parts is provided via signal converters of the first and second modem parts, respectively, and a broadband data connection. An exemplary embodiment of the signal converters on the first modem part side and the second modem part side will be explained next.

FIG. 6 is a schematic block diagram representation of an exemplary implementation of componentry for transmitting data between the first and second modem parts. The componentry comprises a signal converter 130 that may be employed in the first modem part according to any one embodiment described above and a signal converter 140 that may be employed in the second modem part according to any one embodiment described above. As will be explained in detail below, the componentry of FIG. 6 does not only provide a bidirectional point-to-point connection for transmitting data between the first and second modem parts, but also allows control information to be exchanged between the first and second modem parts. The control information allows, inter alia, the operation of the analog-to-digital conversion in the first modem part and the digital signal processing in the second modem part to be synchronized.

The signal converter 130 comprises a buffer 131, a packetizer 132, a depacketizer 133, a buffer 134, a packet generator 135, a packet processing unit 136 and a management unit 137. The signal converter 140 comprises a depacketizer 141, a buffer 142, a buffer 143, a packetizer 144, a packet decoder 145, a phase locked loop (PLL) 146, a packet processing unit 147, and a management unit 148. The buffers 131, 134 of the signal converter 130 and the buffers 142, 143 of the signal converter 140 may be configured for example as FIFOs. In an embodiment, a physical interface 150 between the first and second signal converters comprises an electro-optical interface for each of the signal converters and an optical fiber connecting the electro-optical interfaces.

As will be explained next, the buffers 131, 134, the packetizer 132 and the depacketizer 133 of the signal converter 130 and the buffers 142, 143, the depacketizer 141 and the packetizer 144 of the signal converter 140 are provided for transmitting data between the first and second modem parts. In the exemplary embodiment of FIG. 6, the input of the buffer 131 is coupled to the A/D-converter 45, and the output of the buffer 131 is coupled to packetizer 132. The output of packetizer 132 is coupled to the physical interface 150. The input of the depacketizer 141 of the second modem part is coupled to the physical interface 150, while its output is coupled to the buffer 142. The output of the buffer 142 is coupled to the digital signal processing unit 57 of the second modem part. For upstream data transmission, the buffer 131 receives and stores the sampled signal from the A/D-converter 45. The packetizer 132 retrieves data from the buffer 131 and transmits the data in a packet format via the physical interface 150 to the depacketizer 141 with unpacks the data packets and stores the data in the buffer 142, from where the data is output to the digital signal processing unit 57.

In downstream data transmission, the buffer 143 receives data from the digital signal processing unit 57 and buffers the data. The packetizer 144 retrieves the data from the buffer 143 and packets the data for transmission to the depacketizer 133 via the physical interface 150. The depacketizer 133 unpacks the data packets and provides the data to the buffer 134, from where the data is provided to the D/A-converter 46. The data buffering in the signal converts 130, 140 allows fluctuations in data transmission times via the physical interface 150 to be accommodated. In an embodiment, the packetizers 132, 144 and the depacketizers 141, 133 employ a protocol that allows verification of correct data transmission. In an embodiment, the packetizers and depacketizers employ a Real Time Transport Protocol (RTP).

The packet processing unit 136 and the management unit 137 of the signal converter 130 as well as the packet decoder 145, the PLL 146, the packet processing unit 147 and the management unit 148 comprised by the signal converter 140 allow control signals to be exchanged between the first and second modem parts and, in particular, allow operation of these distant modem parts to be synchronized.

The buffer 134 generates a signal flev that is indicative of the filling level of the buffer 134, which is provided to the packet generator 135. Since the D/A-converter 46 that retrieves data from the buffer 134 is operated at a clock frequency f1, the time variation in the filling level of buffer 134 reflects the operation frequency of the first modem part. The packet generator 135 sends, for example in periodic intervals, the information related to a filling level of the buffer 134, flev, to the signal converter 140 of the second modem part. In one embodiment, the packet generator 135 employs a protocol that allows fast data transmission. In one embodiment, the packet generator 135 employs a Real Time Control Protocol (RTCP) in which the filling level of buffer 134 may be comprised as extension data by a data packet. The information on the filling level of the buffer 134 is then transmitted from the packet generator 135 to the packet decoder 145 that retrieves the information on the buffer filling level. The packet decoder 145 generates a control signal for the PLL 146 based on the filling level. The control signal is such that, on average, the PLL 146 reproduces the frequency f1 at which the first modem part operates in the second modem part. The frequency f1 is then supplied to the digital signal processing unit 57. In the digital signal processing unit 57, the frequency f1 determines the frequency at which the data stored in the buffer 142, i.e., the sampled signal provided by the first modem part, is processed, as well as the rate at which data is retrieved from the buffer 142 and is written into buffer 143. In this way, synchronization of the operation of the first and second modem parts is achieved.

Further, in order to exchange additional management or control information, the signal converter 130 comprises a management unit 137 and a packet processing unit 136, and the signal converter 140 comprises a packet processing unit 147 and a management unit 148. The management units 137, 148 respectively transmit and receive control information and adapt the operation of the respective signal converter in dependence on the control information. The control information is exchanged via the packet processing units 136, 147 and via the physical interface 150. In an embodiment, the packet processing units 136, 147 employ a Transmission Control Protocol (TCP).

In an embodiment, the control information exchanged between the first and second modem parts controls the operation of the first modem part, and the management unit 137 of the signal converter 130 is operative to modify the operation of the first modem part in dependence on the control information received. In an embodiment, the management unit 137 controls the amplification in the analog receiving and transmitting path, respectively, in dependence on the control information. In another embodiment, the management unit 137 activates or deactivates various functional blocks of the first modem part. In yet another embodiment, the management unit 137 selects one of a plurality of sampling rates or similar.

While FIG. 6 shows a system in which the signal converters 130, 140 are employed in a communication system in which the buffer 131 directly receives data from the A/D-converter 45, the signal converters described with reference to FIG. 6 can be easily applied to a communication system in which some digital signal processing is performed in the first modem part, so that, for example, the buffer 131 receives the signal from a digital signal processing unit.

Further, it is to be understood that many modifications of the exemplary embodiment of FIG. 6 are conceivable. In an embodiment, the functional componentry associated with synchronizing the operation of the first and second modem parts, i.e., the packet generator 135, the packet decoder 145 and the PLL 146, are integrated with the functional components that are provided for exchanging control information. In another embodiment, the operation frequency of the digital signal processing unit 57 of the second modem part is taken as a reference for synchronization. In an embodiment, the filling of one of buffers 142, 143 is monitored and the corresponding information on the buffer filling is sent to the signal converter of the first modem part. In still another embodiment, in which a plurality of first modem parts is installed in a street cabinet or similar, synchronization componentry does not necessarily have to be provided separately for each of the first modem parts. Rather, in an embodiment, only a single packet generator 135 is provided for a plurality of first modem parts that receive the same clock signal, one of the first modem parts being coupled to the packet generator 135 to act as a reference.

While embodiments of the invention have been described above, it is to be understood that the present invention is not intended to be limited by these embodiments. In particular, it is to be understood that any functional block or unit shown in the drawings and explained above is shown as a separate entity only for the purpose of better illustrating the principles of the invention. However, the different functional blocks do not need to be provided as separate units. For example, in an embodiment, two or more of the 2-wire to 4-wire converter, the analog receiving path, the analog transmitting path, the A/D-converter, the D/A-converter and the signal converter of the first modem part are configured as an integrated circuit. In another embodiment, two or more of the signal converter, the digital signal processing unit, the framing unit and the transmission convergence function unit comprised by the second modem part are configured as an integrated circuit.

Still further, the functionalities of the functional blocks shown in the drawings and described above may be implemented by hardware, by software or a combination of both.

While in the embodiments described above the first modem part has been described to be provided in a street cabinet, it is to be understood that the first modem part could also be provided at any other suitable location intermediate between customer premises and a central office. In particular, according to an embodiment, a reduction in size and power supply requirements for modem componentry installed at an intermediate location between customer premises and the central office is achieved. Therefore, it is also contemplated to be within the scope of the invention that the first modem parts are not installed in a separate and dedicated street cabinet, but are arranged in or on preexisting infrastructure installations, such as lamp posts. Still further, while in various embodiments described above the first and second modem parts are interconnected by an optical fiber, the broadband data connection between the first and second modem parts may also be implemented using any other suitable technology. In particular, the data connection may also be a wireless data connection.

What is claimed is:

1. A communication system, comprising
a first modem part arranged at a first location,
a second modem part arranged at a second location,
wherein said first modem part and said second modem part in combination perform functionalities of a modem,
wherein said first location is remote from said second location, and
wherein said first modem part and said second modem part each comprise such circuitry that said first modem part and said second modem part in combination perform all functionalities of a fully operational DSL modem.

2. The communication system of claim 1, wherein said first modem part is independent of a DSL standard.

3. The communication system of claim 1, wherein said first modem part comprises an analog interface to transmit analog signals to and from customer premises and A/D-converter circuitry coupled to said analog interface to perform an ND-conversion of an analog signal and D/A-converter circuitry coupled to said analog interface to provide an analog signal to said analog interface.

4. The communication system of claim 3, wherein a sampling frequency of said A/D-converter circuitry is adjustable.

5. The communication system of claim 3, wherein said second modem part comprises digital signal processing circuitry which performs digital signal processing of a digital signal transmitted between said first modem part and said second modem part.

6. The communication system of claim 1, comprising a data link connecting said first modem part and said second modem part.

7. The communication system of claim 6, wherein said data link comprises an optical fiber.

8. The communication system of claim 1, wherein said second location is a central office.

9. The communication system of claim 8, wherein said first location is an intermediate location between said central office and customer premises.

10. The communication system of claim 1, wherein said first modem part comprises first synchronization circuitry and wherein said second modem part comprises second synchronization circuitry, wherein a synchronization signal is transmitted between said first synchronization circuitry and said second synchronization circuitry to synchronize operation of said first modem part and said second modem part.

11. A communication system, comprising
 a first transceiver comprising an analog interface and first circuitry, said first circuitry being coupled to said analog interface,
 a second transceiver remote from said first transceiver and comprising second circuitry,
 a data connection coupled to said first and said second transceiver,
 wherein said first circuitry converts an analog signal transmitted via said analog interface into a first digital intermediate modem signal and vice versa, which first digital intermediate modem signal is transmitted via said data connection between said first transceiver and said second transceiver,
 wherein said second circuitry converts said first digital intermediate modem signal into a second digital signal and vice versa, and
 the first digital intermediate modem signal corresponding to a signal in an intermediate processing state in a fully operational modem.

12. The communication system of claim 11, wherein said first circuitry samples said analog signal to generate said first digital intermediate modem signal.

13. The communication system of claim 11, wherein said first digital intermediate modem signal comprises physical layer data.

14. The communication system of claim 13, wherein said physical layer data is packetized for transmission between said first transceiver and said second transceiver.

15. The communication system of claim 13, wherein said physical layer data is transmitted as unframed data between said first transceiver and said second transceiver.

16. The communication system of claim 11, wherein said second circuitry performs a transmission convergence function.

17. The communication system of claim 11, comprising a subscriber terminal coupled to said analog interface of said first transceiver via a copper line.

18. The communication system of claim 11, wherein said second transceiver comprises a network interface coupled to said second circuitry to transmit said second digital signal to a wide area network.

19. The communication system of claim 11, wherein said data connection is an optical fiber.

20. The communication system of claim 11, wherein said first circuitry and said second circuitry in combination perform functionalities of a DSL modem.

21. The communication system of claim 11, wherein said first transceiver is comprised by a first plurality of first transceivers, each of the first transceivers being coupled to a subscriber terminal via a subscriber line, and wherein said second transceiver is comprised by a second plurality of second transceivers arranged at a central office.

22. The communication system of claim 21, wherein said second plurality of second transceivers is less in number than said first plurality of first transceivers.

23. The communication system of claim 21, comprising a first aggregator and a second aggregator, wherein said first plurality of first transceivers is coupled to said data connection via said first aggregator and wherein said second plurality of second transceivers is coupled to said data connection via said second aggregator.

24. A device, comprising
 an analog interface to receive an analog signal from a subscriber,
 a broadband digital interface to transmit a digital signal to a broadband link,
 modem circuitry coupled to said analog interface and said broadband digital interface to convert said analog signal received at said analog interface into a digital intermediate modem signal and to transmit the digital intermediate modem signal via said broadband digital interface, and
 said first digital intermediate modem signal corresponding to a signal in an intermediate processing state in a fully operational modem.

25. The device of claim 24, wherein said modem circuitry receives a further digital intermediate modem signal via said broadband digital interface to convert said further digital intermediate modem signal into a further analog signal and transmits said further analog signal via said analog interface.

26. The device of claim 24, wherein said device is independent of a DSL standard.

27. The device of claim 24, wherein said modem circuitry comprises an A/D-converter and a D/A-converter.

28. The device of claim 25, wherein said modem circuitry comprises synchronization circuitry generating a synchronization signal indicative of an operation frequency of said device.

29. The device of claim 28, comprising a buffer buffering said further digital intermediate modem signal, wherein said synchronization circuitry monitors a data amount stored in said buffer to generate said synchronization signal.

30. The device of claim 29, wherein said synchronization circuitry comprises a packet generator generating said synchronization signal in the form of a control packet comprising information on said data amount.

31. The device of claim 30, wherein said packet generator generates said control packet employing a Real Time Control Protocol.

32. The device of claim 24, wherein said digital intermediate modem signal is transmitted via said broadband digital interface to a further device remote from said device, wherein said device and said further device in combination perform modem functionalities.

33. The device of claim 24 installed at an intermediate location of a data transmission path from a central office to customer premises.

* * * * *

UNITED STATES PATENT AND TRADEMARK OFFICE
CERTIFICATE OF CORRECTION

PATENT NO.        : 7,876,813 B2                                               Page 1 of 1
APPLICATION NO.   : 11/653111
DATED             : January 25, 2011
INVENTOR(S)       : Stefan Uhlemann et al.

It is certified that error appears in the above-identified patent and that said Letters Patent is hereby corrected as shown below:

Column 10, Claim 3, Line 57 please replace "an ND-conversion" to --an A/D-conversion--

Signed and Sealed this
Eighth Day of March, 2011

David J. Kappos
*Director of the United States Patent and Trademark Office*